US005438832A

United States Patent [19]

Yonekubo et al.

[11] Patent Number: 5,438,832

[45] Date of Patent: Aug. 8, 1995

[54] VARIABLE DISPLACEMENT PUMP WITH ADJUSTMENT RESPONSIVE TO DRIVE MOTOR SPEED

[75] Inventors: Yoshitake Yonekubo, Tokyo; Kenichi Nishiumi; Hisato Naito, both of Kanagawa; Yoshimi Hasegawa, Chiba, all of Japan

[73] Assignee: Kayaba Industry Co., Ltd., Tokyo, Japan

[21] Appl. No.: 114,613

[22] Filed: Aug. 31, 1993

[30] Foreign Application Priority Data

Aug. 31, 1992 [JP] Japan .................................. 4-255926
Aug. 31, 1992 [JP] Japan .................................. 4-255927

[51] Int. Cl.[6] .............................................. F16D 31/02

[52] U.S. Cl. ........................................ 60/449; 60/450; 60/452

[58] Field of Search ................. 60/449, 452, 450, 433, 60/431

[56] References Cited

U.S. PATENT DOCUMENTS

| | | | |
|---|---|---|---|
| 4,448,021 | 5/1984 | Hawkins | 60/449 |
| 4,523,892 | 6/1985 | Mitchell et al. | 60/449 X |
| 4,600,364 | 7/1986 | Nakatani et al. | 60/449 X |
| 4,710,106 | 12/1987 | Iwata et al. | 60/450 X |
| 4,864,994 | 9/1989 | Myers | 60/431 X |
| 4,949,541 | 8/1990 | de Vietro | 60/452 X |
| 5,341,311 | 8/1994 | Liebler | 60/452 X |

FOREIGN PATENT DOCUMENTS

| | | | |
|---|---|---|---|
| 285304 | 10/1992 | Japan | 60/452 |

*Primary Examiner*—John E. Ryznic
*Attorney, Agent, or Firm*—Christopher R. Pastel; Thomas R. Morrison

[57] ABSTRACT

A control device for an actuator adapted to control a discharge pressure of a variable discharge pump by means of a regulator and capable of ensuring sufficient flow control range of change-over valves with respect to a spool stroke even when the number of rotations of an engine for driving the variable discharge pump is reduced to decrease a discharge rate of fluid from the variable discharge pump. Elastic force of a spring of a valve constituting the regulator is adjusted by means of a cylinder associated with a throttle lever for controlling the engine. Also, a control valve is arranged so as to be associated with the throttle lever, so that a pressure on a downstream side of the variable discharge pump is increased to change over the valve.

2 Claims, 5 Drawing Sheets

VARIABLE DISPLACEMENT PUMP WITH ADJUSTMENT RESPONSIVE TO DRIVE MOTOR SPEED

BACKGROUND OF THE INVENTION

This invention relates to a control device for an actuator, and more particularly to a control device for an actuator which is adapted to keep a discharge pressure of a variable discharge pump increased in an amount corresponding to a pressure set by a regulator as compared with a load pressure.

FIG. 1 is a circuit diagram showing a typical power shovel which has been conventionally known in the art. The conventional power shovel includes a variable discharge pump 1 which is associated with or operatively connected to a power source (not shown) such as an engine or the like and connected on a discharge side thereof to a high pressure flow passage 2. The high pressure flow passage 2 is then connected to an input port 5 of a first change-over valve 4 connected to a boom cylinder 3, an input port 8 of a second change-over valve 7 connected to a bucket cylinder 6, and an input port 11 of a third change-over valve 10 connected to a spin motor 9 in turn.

When the first change-over valve 4, second change-over valve 7 and third change-over valve 10 each are at a neutral position shown in FIG. 1, the corresponding input ports 5, 8 and 11 are kept closed. Then, when each of the change-over valves 4, 7 and 10 is changed over to any one of both lateral positions, variable orifices 12 to 14 are rendered open. A degree of opening of each of the variable orifices 12 to 14 is controlled depending on the amount of changing-over of the change-over valve corresponding thereto. The variable orifices 12, 13 and 14 are connected on a downstream side thereof to pressure compensating valves 15, 16 and 17, respectively.

The pressure compensating valves 15 to 17 are arranged so as to communicate on a downstream side thereof with a feed port 18 of the first change-over valve 4, a feed port 19 of the second change-over valve 7 and a feed port 20 of the third change-over valves 10, respectively. The feed ports 18 to 20 of the change-over valves are kept closed when the change-over valves 4, 7 and 10 are at the neutral position. Then, when the change-over valves 4, 7 and 10 are changed over to any one of the lateral positions, the feed ports 18 to 20 are adapted to correspondingly communicate with any one of actuator ports 21 and 22, any one of actuator ports 23 and 24, and any one of actuator ports 25 and 26 in correspondence to changing-over of the valves, respectively. At this time, the remaining ones of the actuator ports 21 and 22, 23 and 24, and 25 and 26 are adapted to communicate with tank passages 27, 28 and 29, respectively.

The first, second and third change-over valves 4, 7 and 10 are formed with load detection ports 30, 31 and 32, respectively. The load detection ports 30 to 32 are kept communicating with the tank passages 27 to 29, respectively, when the first to third change-over valves 4, 7 and 10 are at the neutral position. Then, when the first, second and third change-over valves 4, 7 and 10 are changed over to any one of both lateral positions, the load detection ports 30 to 32 each are permitted to communicate with an actuator port on a high pressure side.

The pressure compensating valves 15, 16 and 17 are provided on both sides thereof with pilot chambers 15*a* and 15*b*, pilot chambers 16*a* and 16*b*, and pilot chambers 17*a* and 17*b*, respectively. The pressure compensating valves 15 to 17 act to guide a pressure on an upstream side thereof to the one pilot chambers 15*a* to 17*a*, respectively, as well as a load pressure on the load detection ports 30 to 32 to the other pilot chambers 15*b* to 17*b*, respectively. The load pressure thus guided to or introduced into the other pilot chambers 15*b* to 17*b* is selected by means of a plurality of shuttle valves 33, resulting in a maximum load pressure in each of the circuit systems being guided to or introduced into each of the other pilot chambers 15*b* to 17*b*. The other pilot chambers 15*b*, 16*b* and 17*b* are provided thereon with springs 34, 35 and 36, respectively, which are adapted to generate elastic force acting on the pilot chambers 15*b* to 17*b*.

Thus, the pressure compensating valves 15 to 17 carry out a control operation in such a manner that the pressure on the upstream side of the valves 15 to 17 is kept at a level increased by an amount corresponding to the elastic force of the springs 34 to 36 as compared with the maximum load pressure in the circuit systems.

The maximum load pressure selected by the shuttle valves 33 is introduced into a pilot chamber 37*a* which is one of two pilot chambers 37*a* and 37*b* of a valve 37 for controlling the variable discharge pump 1. The pilot chamber 37*a* is so constructed that elastic force of a spring 38 acts thereon. To tile other pilot chamber 37*b* of the valve 37 is guided a pressure in the high pressure flow passage 2 or a discharge pressure of the variable discharge pump 1. Such construction results in the valve 37 being changed over between a normal position (a) and a changed-over position (b) depending on a relative difference between the discharge pressure of tile variable discharge pump 1, and the maximum load pressure and the elastic force of the spring 38.

When the valve 37 is changed over to the normal position (a), a control cylinder 39 for controlling a tilting angle of the variable discharge pump 1 is permitted to communicate with a tank T to keep a flow rate of fluid discharged from tile pump 1 maximum; whereas, at tile changed-over position (b), a pressure of the pump is introduced into tile control cylinder 39 to decrease the flow rate of fluid from the pump 1. The valve 37 is adapted to determine a degree of opening thereof while moving between the normal position (a) and the changed-over position (b).

Reference numeral 40 designates a main relief valve, which serves to set a maximum pressure in each of circuit systems of the boom cylinder 3, bucket cylinder 6 and spin motor 9.

As will be noted from the foregoing, the conventional control device thus constructed is the load-sensing type. Thus, the variable discharge pump 1 discharges a pressure increased by an amount corresponding to the elastic force of the spring 38 as compared with the maximum load pressure. The pressure compensating valves 15 to 17 of the circuit systems control a pressure on the downstream side of the variable orifices 12, 13 and 14 of the first, second and third change-over valves 4, 7 and 10 depending on the maximum load pressure. This causes a pressure difference between a frontward side of each of the variable orifices 12 to 14 and its rearward side to be constant, to thereby feed fluid ill an amount proportional to the amount of changing-over of each of the change-over valves 4, 7 and 10 to each of actuators.

The variable discharge pump 1, as described above, is associated with or operatively connected to the engine (not shown), so that the number of rotations of the former is determined depending on the number of rotations of the latter.

In the conventional control device constructed as described above, the elastic force of the spring 38 provided on the valve 37 is rendered constant, so that gain characteristics in flow control by the control device are not varied as shown in FIG. 2.

As will be apparent from FIG. 2, the conventional control device permits a flow control range thereof to be sufficiently increased as indicated at $\alpha$ when the number of rotations of the engine is kept at an increased level. However, when the number of rotations of the engine is reduced to cause a maximum flow rate of fluid discharged from the variable discharge pump 1 to be $Q_1$, the control device causes the control range to be decreased as indicated at $\beta$, because the gain characteristics are not varied as described above.

Such a decrease in flow control range to $\beta$ which is encountered when a flow rate of fluid discharged from the variable discharge pump 1 is reduced causes a disadvantage of deteriorating an operational feeling of the change-over valves as compared with an increase in flow control range to $\alpha$ which ensures an increase in flow rate of fluid discharged from the pump 1.

SUMMARY OF THE INVENTION

The present invention has been made in view of the foregoing disadvantage of the prior art.

It is an object of the present invention to provide a control device for an actuator which is capable of keeping a control range thereof increased to prevent deterioration of an operational feeling even when the number of rotations of a power source such as an engine is reduced to decrease a flow rate of fluid discharged from a variable discharge pump.

In accordance with the present invention, a control device for an actuator is provided, which comprises a variable discharge pump connected to a power source, change-over valves for controlling actuators, the change-over valves are connected to the variable discharge pump, and a regulator which is arranged for controlling the variable discharge pump and into which a load pressure of each of the actuators is introduced, the regulator including a control cylinder for controlling a tilting angle of the variable discharge pump and a valve for controlling the control cylinder, the valve having a pilot chamber defined on each of both sides thereof, one of the pilot chambers of the valve being provided with a spring, the one pilot chamber of the valve being applied thereto the load pressure of the actuators and elastic force of the spring, the other of the pilot chambers of the valve being applied thereto a discharge pressure of the variable discharge pump, resulting in the discharge pressure of the variable discharge pump being kept increased in an amount corresponding to the elastic force of the spring as compared with the load pressure of the actuators.

The control device of the present invention thus generally constructed is characterized in that it further comprises an adjusting mechanism for adjusting the elastic force of the spring in proportion to the number of rotations of the power source.

Also, in accordance with the present invention, there is provided a control device for an actuator, which comprises a variable discharge pump connected to a power source, change-over valves for controlling actuators, the change-over valves are connected to the variable discharge pump, and a regulator which is arranged for controlling the variable discharge pump and into which a load pressure of each of the actuators is introduced, the regulator including a control cylinder for controlling a tilting angle of the variable discharge pump and a valve for controlling the control cylinder, the valve having a pilot chamber defined on each of both sides thereof, one of the pilot chambers of the valve being provided with a spring, the one pilot chamber of the valve being applied thereto the load pressure of the actuators and elastic force of the spring, the other of the pilot chambers of the valve being applied thereto a discharge pressure of the variable discharge pump, resulting in the discharge pressure of the variable discharge pump being kept increased in an amount corresponding to the elastic force of the spring as compared with the load pressure of the actuators.

The control device of the present invention is characterized in that it further comprises a control valve arranged between the variable discharge pump and the change-over valves and constructed so as to keep a maximum degree of opening thereof when the number of rotations of the power source is maximum and a minimum degree of opening thereof when the number of rotations of the power source is minimum, resulting in a pressure on an upstream side of the control valve acting on the other pilot chamber of the valve.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENTS

Now, a control device for an actuator according to the present invention will be described hereinafter with reference to FIGS. 3 to 5.

Figure 3:
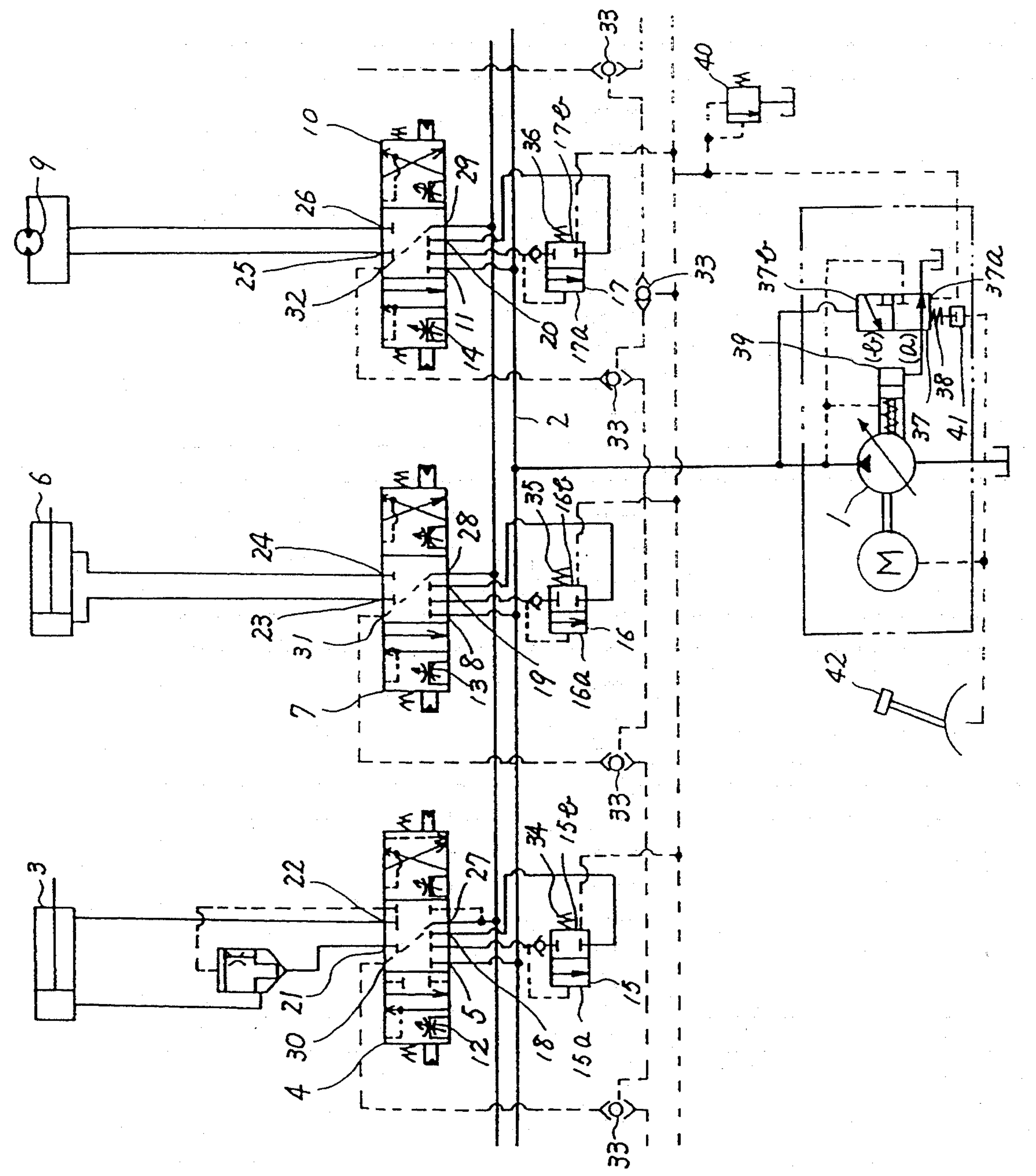
FIG. 3 is a circuit diagram showing an embodiment of a control device for an actuator according to the present invention.
Figure 4:
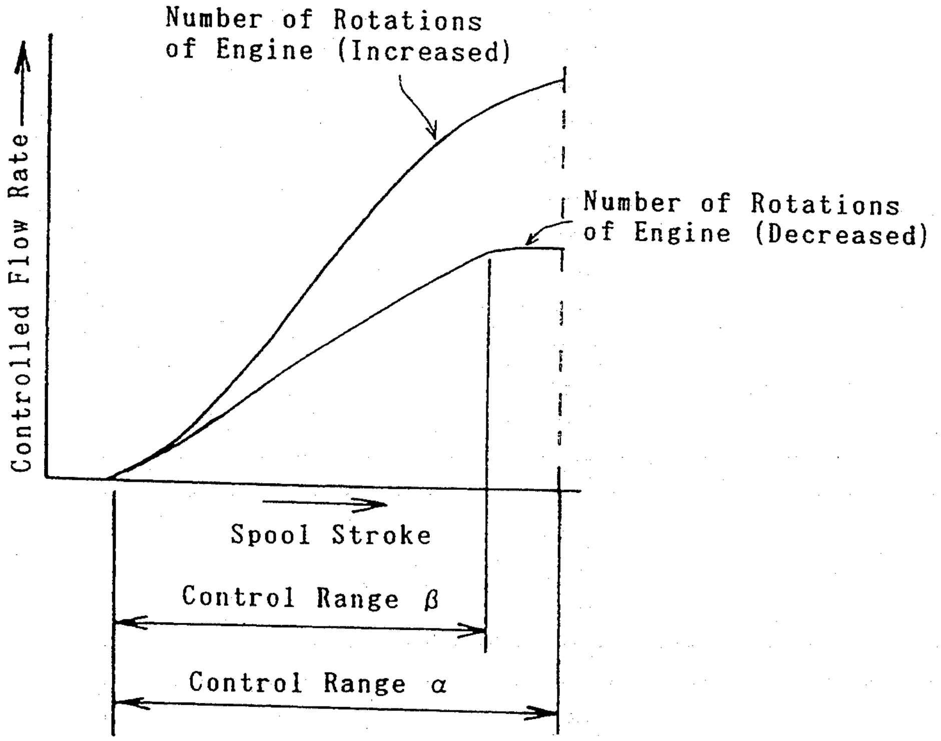
FIG. 4 is a graphical representation showing a relationship between a spool stroke and a controlled flow rate in the control device shown in FIG. 3.

Referring first to FIG. 3, an embodiment of a control device for an actuator according to the present invention is illustrated. In a control device of the illustrated embodiment, a spring 38 arranged on a valve 37 is provided with a cylinder 41 for regulating or adjusting elastic force of the spring 38. Also, the cylinder 41 is associated with or operatively connected to a throttle lever 42 of a power source such as an engine or the like. The throttle lever 42 is constructed so as to permit the cylinder 41 to decrease the elastic force of the spring 38 when the throttle lever 42 is moved or declined in a direction of decreasing the number of rotations of the engine, as well as to increase the elastic force when it is moved in a direction of increasing the number of rotations of the engine.

Figure 1:
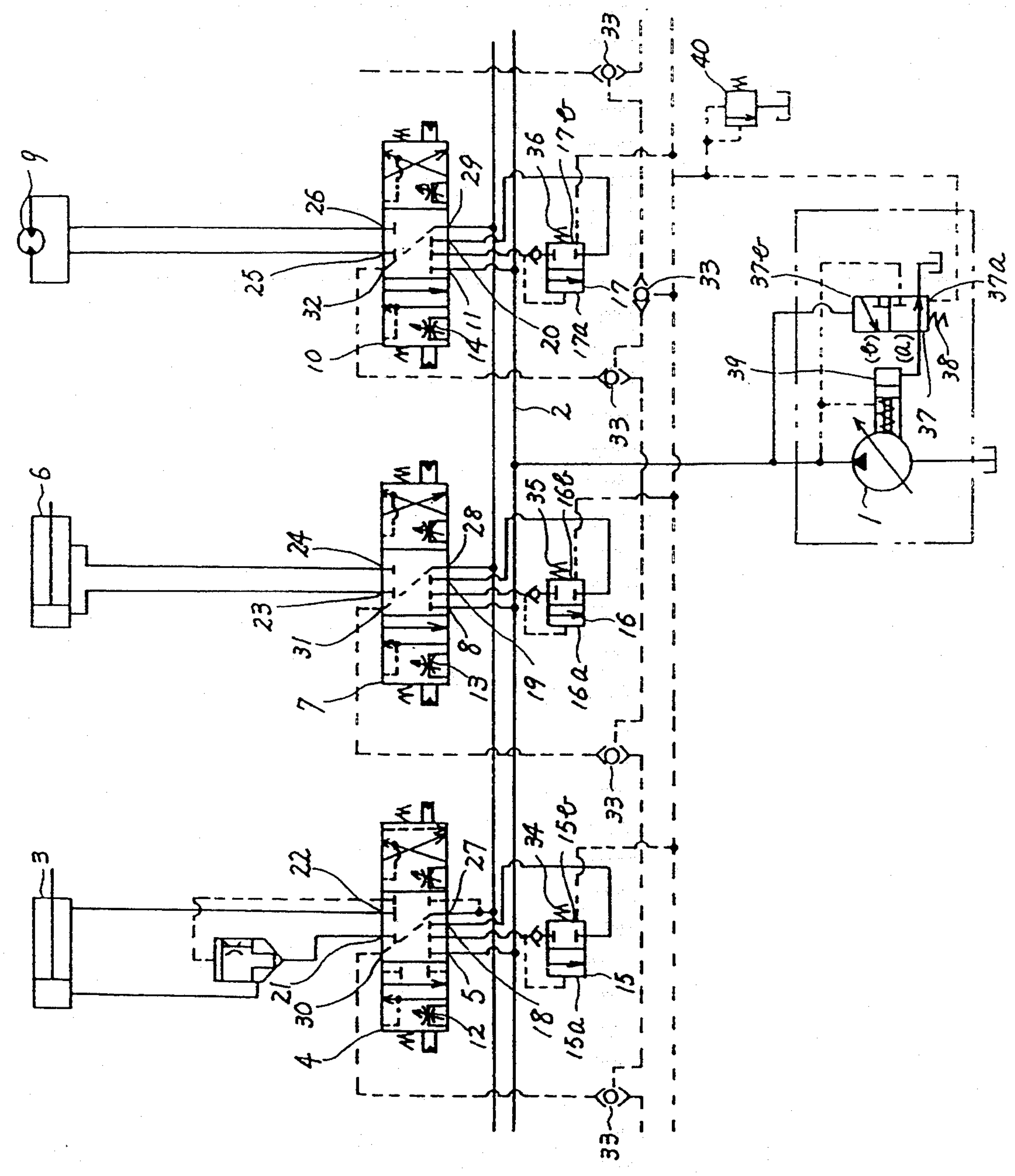
FIG. 1 PRIOR ART
FIG. 1 is a circuit diagram showing a conventional control device for an actuator.
Figure 2:
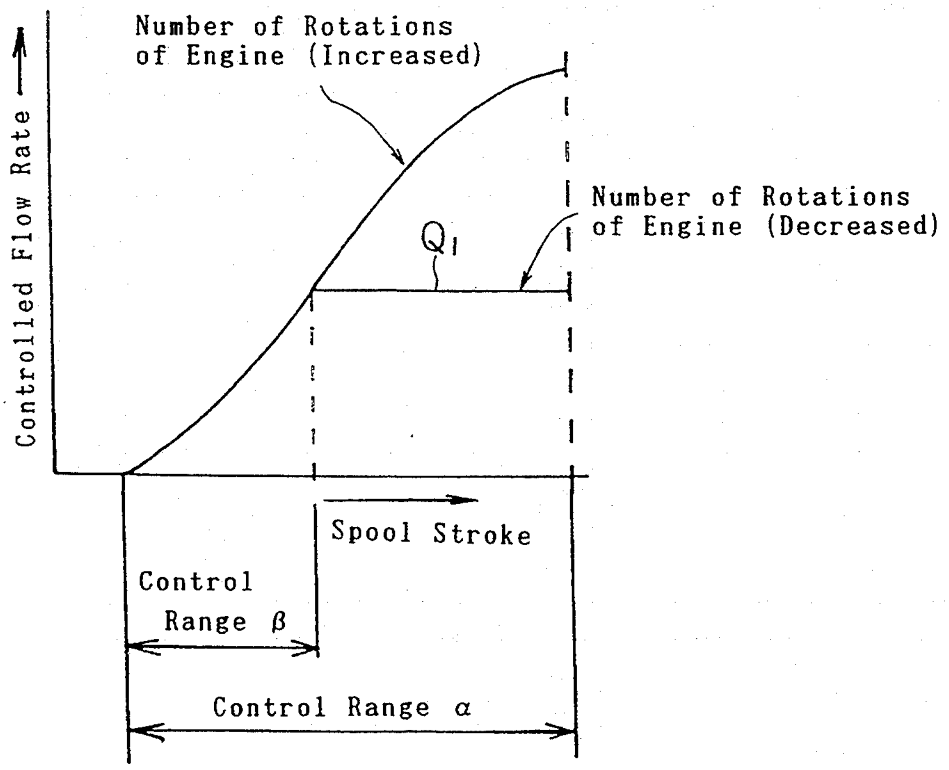
FIG. 2 PRIOR ART
FIG. 2 is a graphical representation showing a relationship between a spool stroke and a controlled flow rate in a conventional control device.

The remaining part of the illustrated embodiment may be constructed in substantially the same manner as the prior art described above with reference to FIG. 1. In the illustrated embodiment, the valve 37 and control cylinder 39 cooperate with each other to constitute a regulator in the present invention.

Now, the manner of operation of the control device of the illustrated embodiment will be described hereinafter with reference to FIG. 4 as well as FIG. 3. When the throttle lever 42 is tilted in a direction of decreasing the number of rotations of the engine, the cylinder 41 is operated to relatively reduce the elastic force of the spring 38.

This results in the valve 37 being changed over to decrease a gain of a controlled flow rate, even when a discharge rate of fluid from the variable discharge pump 1 or a flow rate of fluid discharged from the pump 1 is decreased to cause a rate of change of the load pressure to be reduced. Such a relationship is shown in FIG. 4, wherein when the number of rotations of the engine is reduced, a gain of the controlled flow rate is decreased as described above, to thereby permit a control range by the control device of the illustrated embodiment to be increased as indicated at $\beta$ as compared with the prior art.

When the throttle lever 42 is tilted in a direction of increasing the number of rotations of the engine, the cylinder 41 is likewise actuated to relatively increase the elastic force of the spring 38. Thus, an increase in flow rate of fluid discharged from the variable discharge pump 1 permits the elastic force of the spring 38 to be increased, resulting in the control range being increased as indicated at $\alpha$ as in the prior art.

Thus, the control device of the illustrated embodiment constructed as described above permits a flow control range of the change-over valves with respect to a spool stroke to be adequately increased even when a discharge rate of fluid from the variable discharge pump 1 or a flow rate of fluid discharged from the pump which is varied depending on the number of rotations of the power source or engine, to thereby prevent deterioration of an operational feeling of the change-over valves.

In the illustrated embodiment, the cylinder 41 and throttle lever 42 cooperate with each other to form an adjusting mechanism for adjusting the elastic force of the spring 38. For this purpose, a hydraulic mechanism may be used for adjusting the elastic force. Alternatively, a link mechanism may be used to electrically or mechanically control the elastic force.

Figure 5:
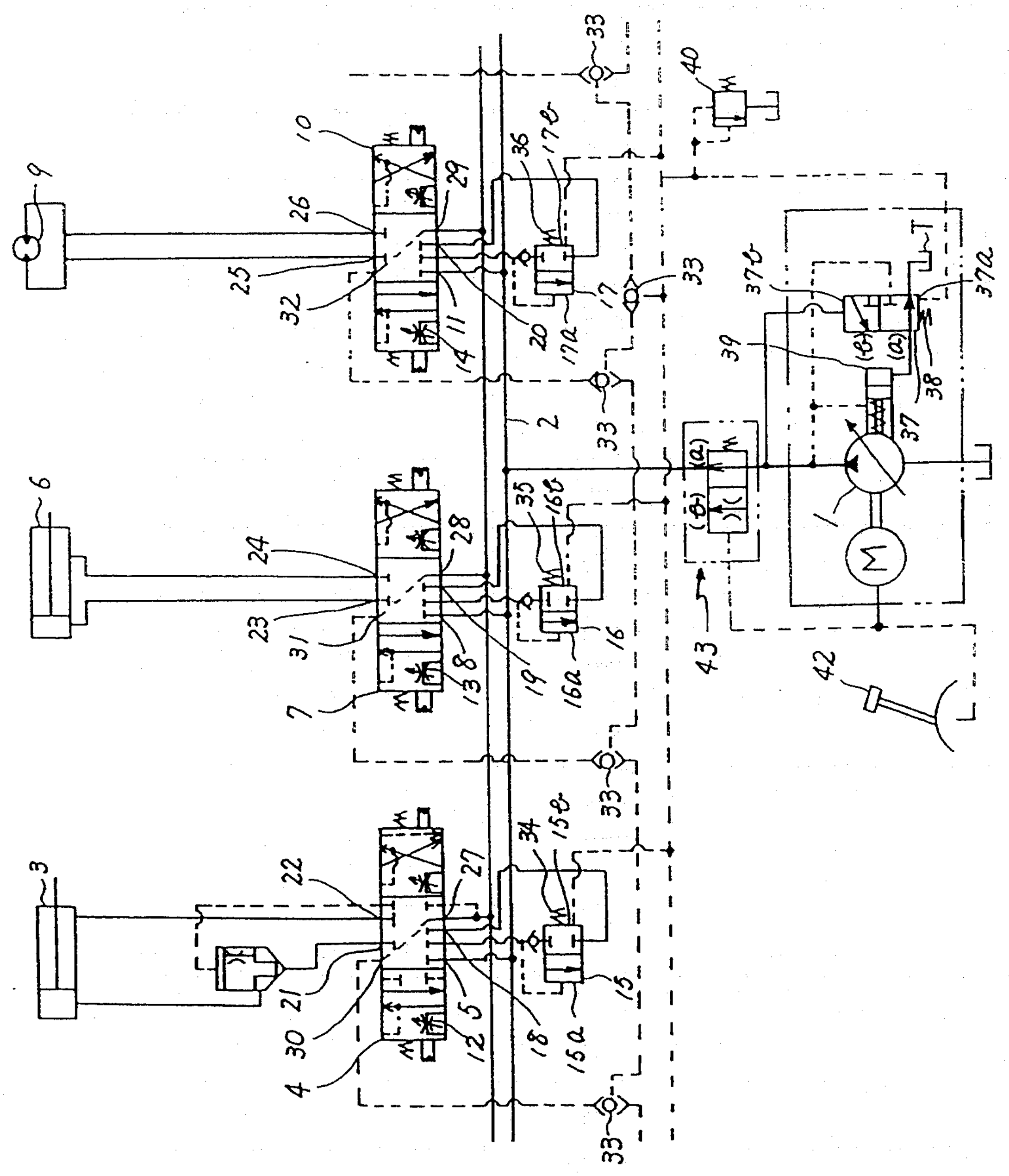
FIG. 5 is a circuit diagram showing another embodiment of a control device for an actuator according to the present invention.

Referring now to FIG. 5, another or a second embodiment of a control device for an actuator according to the present invention is illustrated. In a control device of the second embodiment, a control valve 43 is provided between a variable discharge pump 1 and a high pressure flow passage 2. The remaining part of tile second embodiment may be constructed in substantially the same manner as the above-described embodiment.

In the illustrated embodiment, a valve 37 and a control cylinder 39 cooperate with each other to constitute a regulator.

The control valve 43 is arranged on a downstream side based on a passage through which a discharge pressure of the pump 1 is introduced into the other pilot chamber 37*b* of the valve 37. The control valve 43 thus arranged is changed over between a fully open position (a) and a restricted position (b) and a degree of opening of the control valve 43 is controlled depending on the amount of changing-over of the valve 43. A minimum degree of opening of the valve 43 at the restricted position (b) is set to be smaller than a degree of opening of each of variable orifices 12, 13 and 14 of change-over valve 4, 7 and 10.

The control valve 43 thus constructed is hydraulically associated with a throttle lever 42 of a power source such as an engine or the like. Thus, when the throttle lever 42 is moved or tilted in a direction of decreasing the number of rotations of the engine, the control valve 43 is permitted to be changed over to the restricted position (b).

Now, the manner of operation of the second embodiment thus constructed will be described hereinafter.

In the control device of the second embodiment, when the throttle lever 42 is tilted in a direction of decreasing the number of rotations of the engine, the control valve 43 is changed over to the restricted position (b) to substantially reduce a pressure on a downstream side of the variable discharge pump 1, resulting in a pressure on an upstream side based on the control valve 43 being increased. The pressure on the upward stream of the control valve 43 acts on the other pilot chamber 37*b* of the valve 37, so that the valve 37 is changed over to the restricted position (b). This permits the control device of the illustrated embodiment to decrease a gain of a controlled flow rate to keep a flow control range of the change-over valves with respect to a spool stroke increased even when the number of rotations of the engine is reduced.

When the throttle lever 42 is moved or tilted in a direction of increasing the number of rotations of the engine, the control valve 43 is changed over to the fully open position (a), resulting in a degree of opening of the control valve 43 being increased.

As noted from the above, the control device of the illustrated embodiment permits a gain of the controlled flow rate to be reduced to substantially increase the control range, even when a discharge rate of fluid from the variable discharge pump or a flow rate of fluid discharged from the variable discharge pump which is varied depending on the number of rotations of the power source or engine is reduced. Thus, the illustrated embodiment effectively prevents deterioration of an operational feeling of the change-over valves.

In the illustrated embodiment, the control valve 43 and throttle lever 42 are hydraulically associated with each other. Alternatively, they may be mechanically or electrically associated with each other by means of a link or the like.

As can be seen from the foregoing, the control device of the present invention effectively prevents an operational feeling of the change-over valves and therefore that of the control device from being deteriorated, even when the number of rotations of the power source such as an engine is reduced.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A control device for an actuator comprising:

a variable discharge pump connected to a power source;

change-over valves for controlling actuators;

said change-over valves being connected to said variable discharge pump;

a regulator which is arranged for controlling said variable discharge pump and into which a load pressure of each of the actuators is introduced;

said regulator including a control cylinder for controlling a tilting angle of said variable discharge pump and a valve for controlling said control cylinder;

said valve having a pilot chamber defined on each of both sides thereof;

one of said pilot chambers of said valve being provided with a spring;

said one pilot chamber of said valve being applied thereto the load pressure of the actuators and elastic force of said spring;

the other of said pilot chambers of said valve being applied thereto a discharge pressure of said variable discharge pump, resulting in the discharge pressure of said variable discharge pump being kept increased in an amount corresponding to the elastic force of said spring as compared with the load pressure of the actuators; and an adjusting mechanism for adjusting the elastic force of said spring in proportion to the number of rotations of said power source.

2. A control device for an actuator comprising:

a variable discharge pump connected to a power source;

change-over valves for controlling actuators;

said change-over valves being connected to said variable discharge pump;

a regulator which is arranged for controlling said variable discharge pump and into which a load pressure of each of the actuators is introduced;

said regulator including a control cylinder for controlling a tilting angle of said variable discharge pump and a valve for controlling said control cylinder;

said valve having a pilot chamber defined on each of both sides thereof;

one of said pilot chambers of said valve being provided with a spring;

said one pilot chamber of said valve being applied thereto the load pressure of the actuators and elastic force of said spring;

the other of said pilot chambers of said valve being applied thereto a discharge pressure of said variable discharge pump, resulting in the discharge pressure of said variable discharge pump being kept increased in an amount corresponding to the elastic force of said spring as compared with the load pressure of the actuators;

a control valve arranged between said variable discharge pump and said change-over valves and constructed so as to keep a maximum degree of opening thereof when the number of rotations of the power source is maximum and a minimum degree of opening thereof when the number of rotations of the power source is minimum, resulting in a pressure on an upstream side of said control valve acting on said the other pilot chamber of said valve; and means for adjusting said control valve in proportion to the number of rotations of said power source.

* * * * *